US006606245B2

United States Patent
Oda et al.

(10) Patent No.: US 6,606,245 B2
(45) Date of Patent: *Aug. 12, 2003

(54) POWER SUPPLY APPARATUS

(75) Inventors: Takashi Oda, Kato-gun (JP); Hideki Okajima, Nishinomiya (JP); Tatsuhito Horiuchi, Kakogawa (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/984,484

(22) Filed: Oct. 30, 2001

(65) Prior Publication Data
US 2002/0085355 A1 Jul. 4, 2002

(30) Foreign Application Priority Data
Oct. 31, 2000 (JP) ........................................ 2000/333926

(51) Int. Cl.⁷ ................................................. H05K 7/20
(52) U.S. Cl. ..................... 361/695; 165/80.3; 320/107; 429/26; 429/99
(58) Field of Search ................................. 363/141, 144; 165/121–126, 43, 80.3; 174/16.1; 257/712, 713, 721; 361/698, 692, 694, 695, 715, 716, 522, 541; 307/147, 148, 150; 320/107, 150; 429/22, 26, 27, 30, 34, 99, 120

(56) References Cited

U.S. PATENT DOCUMENTS

| 4,126,269 A | * 11/1978 | Bruges |
| 4,395,468 A | * 7/1983 | Isenberg ...................... 429/31 |
| 5,210,680 A | * 5/1993 | Scheibler |
| 5,753,384 A | * 5/1998 | Kimberg ...................... 429/27 |
| 5,879,833 A | * 3/1999 | Yoshii et al. .................. 429/62 |
| 5,904,999 A | * 5/1999 | Kimberg et al. ............... 429/27 |
| 6,011,688 A | * 1/2000 | Thornburg et al. .......... 361/695 |
| 6,105,875 A | * 8/2000 | LaGrotta et al. |
| 6,211,646 B1 | * 4/2001 | Kouzu et al. ................ 320/107 |
| 6,340,877 B1 | * 1/2002 | Mita et al. ................... 320/112 |
| 6,433,509 B2 | * 8/2002 | Kobayashi et al. .......... 320/107 |
| 6,445,582 B1 | * 9/2002 | Oda et al. |
| 6,498,406 B1 | * 12/2002 | Horiuchi et al. |

FOREIGN PATENT DOCUMENTS

| JP | 10-270095 | * 10/1998 |
| JP | 11-329518 | * 11/1999 |

* cited by examiner

Primary Examiner—Gerald Tolin
(74) Attorney, Agent, or Firm—Wenderoth, Lind & Ponack, L.L.P.

(57) ABSTRACT

A power supply apparatus including a plurality of power modules, a holder-case, and a fan. The holder-case is box-shaped with a first surface plate and second surface plate as two surfaces, and contains a plurality of power modules arranged laterally, parallel, and in the same plane. A plurality of walls are provided between the plurality of laterally arranged power modules, and divide the holder-case interior into a plurality of rows of partitions. One row of power modules is disposed in each partition row. The power supply apparatus uses the fan to divide and induce air flow through flow inlets formed in the first surface plate into the plurality of partitions, and expels air out exhaust outlets formed in the second surface plate to cool power modules disposed inside each partition.

20 Claims, 8 Drawing Sheets

POWER SUPPLY APPARATUS

This application is based on application No. 2000-333926 filed in Japan on Oct. 31, 2000, the content of which is incorporated hereinto by reference.

BACKGROUND OF THE INVENTION

This invention relates to a high current power supply apparatus primarily used to power a motor to drive a vehicle such as a hybrid or electric car.

A high current, high output power supply apparatus, used as a power source for a motor to drive an automobile, contains power modules. Power modules are a plurality of series connected batteries, and they are in turn connected in series to raise the output voltage of the power supply apparatus. The purpose of this is to increase the output of the driving motor. Extremely high currents flow in a power supply apparatus used for this type of application. For example, in a vehicle such as a hybrid car, when starting to move or accelerating, battery output must accelerate the car, and extremely high currents over 100A can flow. High currents also flow during short period, rapid charging.

In a high current power supply apparatus, forced cooling is required when battery temperature rises. In particular, in a power supply apparatus with many power modules inserted in vertical and horizontal columns and rows in a holder-case, it is important to uniformly cool each power module. This is because performance degradation will result for a battery which rises in temperature when battery cooling is non-uniform.

Systems which house a plurality of power modules in a holder-case and cool each power module more uniformly are cited, for example, in Japanese Patent Applications HEI 10-270095 (1998) and HEI 11-329518 (1999). As shown in the cross-sectional view of FIG. 1, the power supply apparatus of the former application cools internally housed power modules 21 by forcing air to flow from air intakes 23 which form the base of the holder-case 22 to exhaust outlets 24 which form the top of the holder-case 22. Cooling adjustment fins 25 are disposed inside the holder-case 22 to adjust the speed of air flowing over the surfaces of power modules 21.

In a holder-case 22 of this configuration, air flows more rapidly over the surfaces of power modules 21 disposed near the top than those near the bottom. The purpose of this is to avoid a temperature differential between power modules 21 at the top and bottom. If the flow rate of air passing over the surfaces of power modules 21 at the top and bottom is made the same, power modules 21 at the bottom will be cooled more efficiently than those at the top because air flowing over the surfaces of power modules 21 at the bottom has a lower temperature.

To make the flow rate of air over power modules 21 at the top faster than the flow rate over those at the bottom, the gap for air flow between the cooling adjustment fins 25 and the power modules 21 is gradually made narrower towards the top of the holder-case 22. This is because air flow becomes faster as the gap for air flow becomes narrower.

This type of power supply apparatus cools power modules near the bottom with cool air and power modules near the top with high flow rate air to establish a more uniformly cooled environment for power modules at both the top and bottom. However, it is extremely difficult to cool upper and lower power modules under very uniform conditions in this type of system. This is because the temperature of cooling air for power modules at the bottom is low, and the temperature of cooling air for power modules at the top becomes high. It is difficult to cool upper power modules with the same efficiency as lower power modules even by increasing the flow rate over power module surfaces when upper power module cooling air temperature has become high. For this reason power modules near the air intakes can be cooled efficiently, but power modules near the exhaust outlets are difficult to cool efficiently and this system has the drawback that a temperature differential develops over power modules housed in the holder-case. This has the deleterious effect that power modules, which are near exhaust outlets and very difficult to efficiently cool, become hot and easily degraded.

As shown in the cross-sectional view of FIG. 2, the power supply apparatus cited in the later patent application directs cooling air into the holder-case 27 from intermediate positions along the holder-case 27. Air directed into the holder-case 27 from intermediate positions supplies cool air to regions near the outlet and makes the inside temperature of the holder-case 27 uniform. This system can reduce the temperature differential across the holder-case 27, but the flow rate of air inside drops due to air entering from intermediate positions along the holder-case 27. To efficiently cool power modules 26, it is important to lower the temperature of the cooling air, but it is also important to increase the flow rate of air over the surfaces of the power modules 26. Even if cooling air temperature is lowered, the region of air immediately in contact with the surface of a power module will rise in temperature if flow rate slows. Since a power module 26 is cooled by the air in immediate contact with its surface, it cannot be efficiently cooled if the air temperature of this region becomes high.

The present invention was developed to correct these types of drawbacks seen in prior art power supply apparatuses. Thus, it is a primary object of the present invention to provide a power supply apparatus which can cool all of the plurality of power modules housed in a holder-case more uniformly and effectively prevent battery performance degradation caused by temperature differentials.

The above and further objects and features of the invention will more fully be apparent from the following detailed description with accompanying drawings.

SUMMARY OF THE INVENTION

The power supply apparatus of the present invention is provided with a plurality of power modules, a holder-case which houses the power modules arranged in rows in a parallel fashion and which cools the power modules by passing air through the inside of the case, and a fan which forcibly supplies air to the holder-case or intakes air through the holder-case. The holder-case is box shaped and has a first surface plate and a second surface plate disposed on opposite sides. A plurality of power modules are arranged side-by-side in a parallel fashion and in a single plane along the first surface plate and second surface plate. Further, walls are established between the plurality of power modules laterally arrayed in the holder-case. The walls extend from the first surface plate to the second surface plate to divide the interior into a plurality of rows of partitions, and one row of power modules are disposed in each partition row. In addition, the holder-case has flow inlets opened through the first surface plate to divide air flow and direct it into cooling ducts formed by the plurality of partition rows. Exhaust outlets are also opened through the second surface plate to expel air which has passed through the plurality of partition cooling ducts. The power supply apparatus uses the fan to divide and divert air flow through the first surface plate flow inlets into the plurality of partitions, passes air through the cooling ducts to cool the power modules, expels air which has performed its cooling function through second surface plate exhaust outlets, and thereby cools the power modules disposed inside the plurality of partition columns.

This configuration of power supply apparatus has the characteristic that all of the plurality of power modules housed in the holder-case can be more uniformly cooled, and battery performance degradation caused by temperature differentials can be effectively prevented. This is because the power supply apparatus of the present invention disposes a plurality of power modules side-by-side in a parallel fashion in a single plane, divides the interior of the holder-case with walls into a plurality of rows of partitions, disposes one row of power modules in each partition row, and causes air to divide and flow from the flow inlets of the first surface plate through the plurality of partitions and out the exhaust outlets of the second surface plate to cool the power modules disposed in the plurality of partition rows. Since one row of power modules is separately disposed in each partition row in this configuration of power supply apparatus, each power module is independently cooled by air passing through its cooling ducts without any influence from other power modules. Further, since cooling air passing through each partition cools only one row of power modules, that cooling air is fresh and not warmed by other power modules, and cooling can be extremely efficient. In this manner, a power supply apparatus which can cool each power module under ideal conditions can efficiently and uniformly cool all of the plurality of power modules.

The power supply apparatus of the present invention can be provided with an air inlet duct at the surface of the first surface plate. In this power supply apparatus, air flow can be directed from the air inlet duct, into the flow inlets, and through the partitions. Further, flow inlets opened through the first surface plate can be made smaller at the upstream end of the air inlet duct than at the downstream end of the air inlet duct. This configuration of power supply apparatus can uniformly supply cooling air to all partitions. In addition, the power supply apparatus may have a two tiered holder-case with the two tiers disposed in a parallel fashion in mutual opposition around the air inlet duct.

The power supply apparatus of the present invention can also be provided with an air outlet duct at the surface of the second surface plate. In this power supply apparatus, air passed through each partition and out each exhaust outlet is re-combined in the outlet duct and expelled from the system. Further, exhaust outlets opened through the second surface plate can be made larger at the upstream end of the outlet duct than at the downstream end of the outlet duct. This configuration of power supply apparatus can uniformly supply cooling air to all partitions. In addition, the power supply apparatus may have a two tiered holder-case with the two tiers disposed in a parallel fashion in mutual opposition around the outlet duct.

In the power supply apparatus of the present invention, the flow inlets and exhaust outlets can be made as slits extending in the lengthwise direction of the power modules.

In the power supply apparatus of the present invention, the power modules can be shaped as circular cylinders, the cross-sectional shape of the inside of the partitions housing the power modules can be polygonal with greater than or equal to eight sides, or the cross-sectional shape of the inside of the partitions can be circular to elliptical. In this power supply apparatus, cooling ducts are established between power module surfaces and partition inner walls, and air flow in the partitions flows along power module surfaces via these cooling ducts.

In the power supply apparatus of the present invention, cooling ducts can be made approximately the same width around the entire perimeter of each power module.

Further, in the power supply apparatus of the present invention, retaining projections extending from partition inner walls of the first surface plate and second surface plate can be formed by single piece construction to hold power modules in place. In this power supply apparatus, the ends of these retaining projections contact the surface of a power module and hold that power module in place inside the partition.

Still further, in the power supply apparatus of the present invention, the power modules can be shaped as circular columns, and these power modules can be disposed at partition centers.

DETAILED DESCRIPTION OF THE INVENTION

Figure 1:
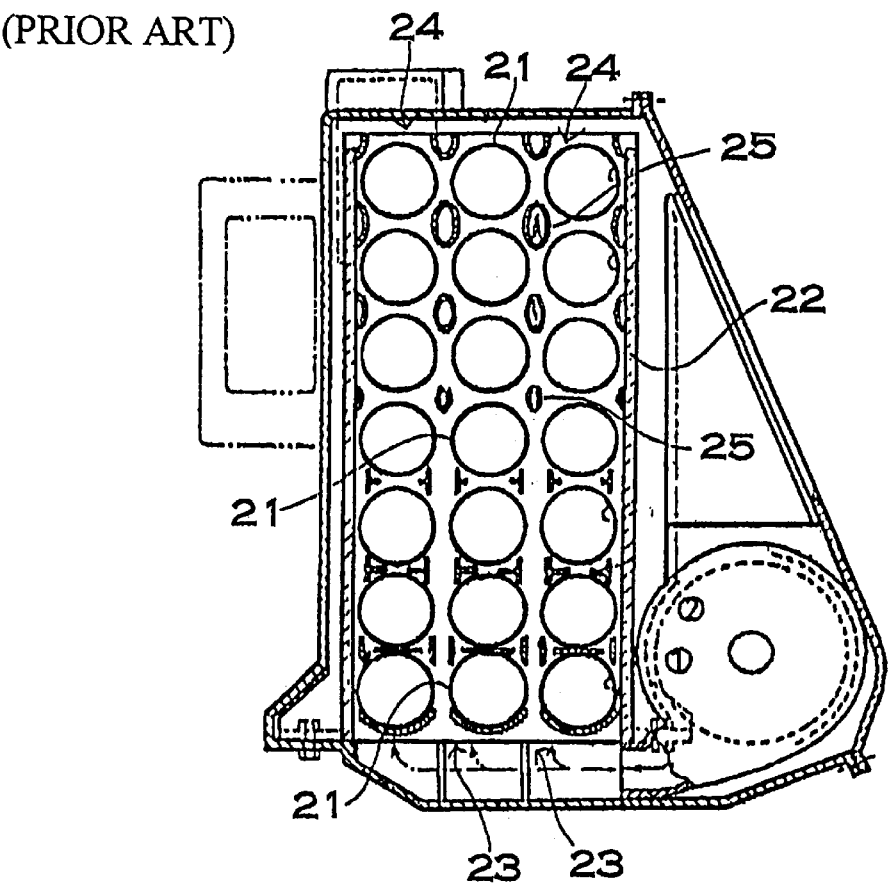
FIG. 1 is a cross-sectional view of a related art power supply apparatus.
Figure 2:
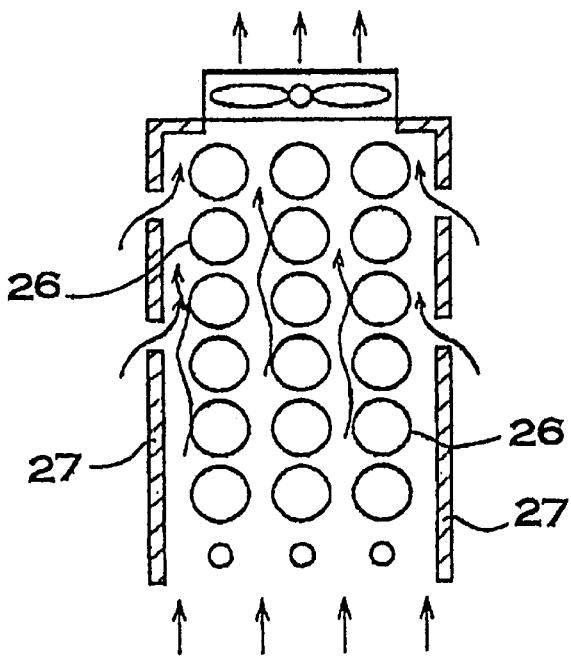
FIG. 2 is a cross-section view of another related art power supply apparatus.
Figure 3:
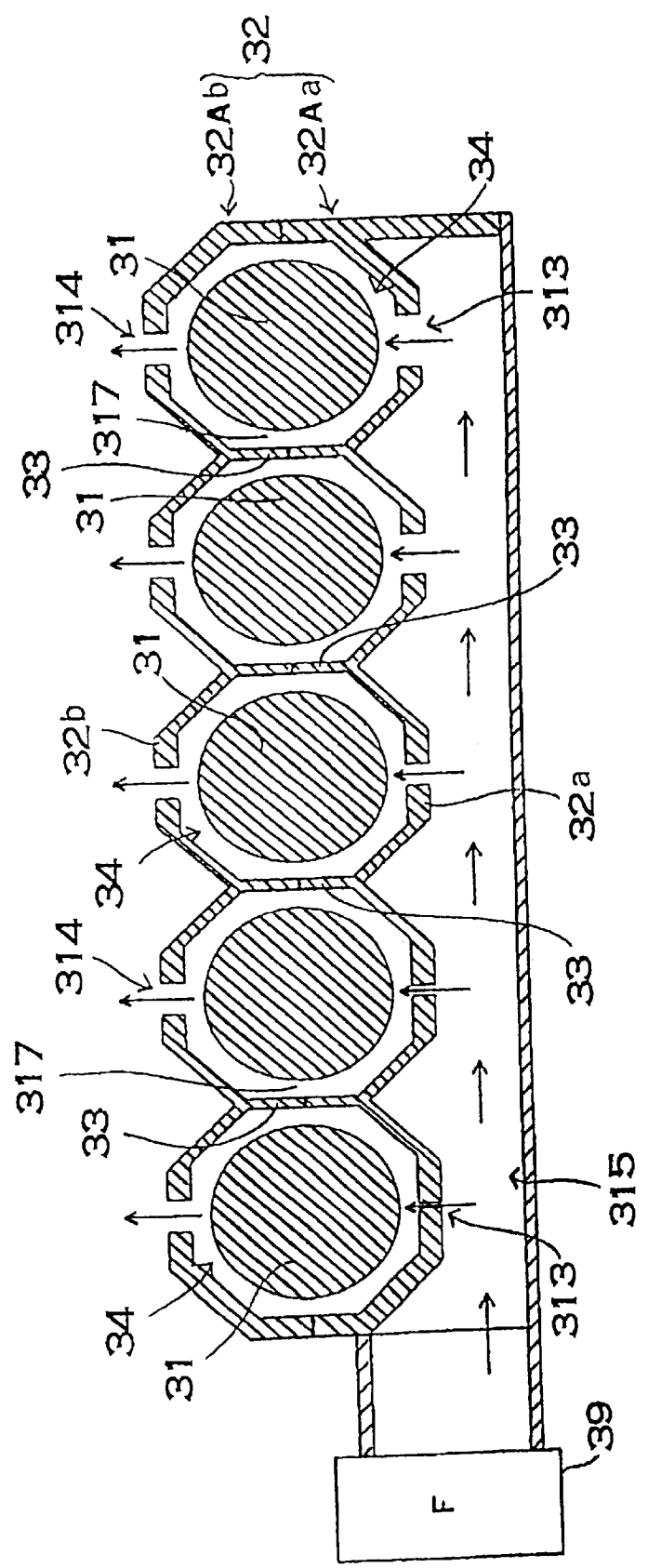
FIG. 3 is a side cross-sectional view of an embodiment of the power supply apparatus of the present invention.
Figure 4:
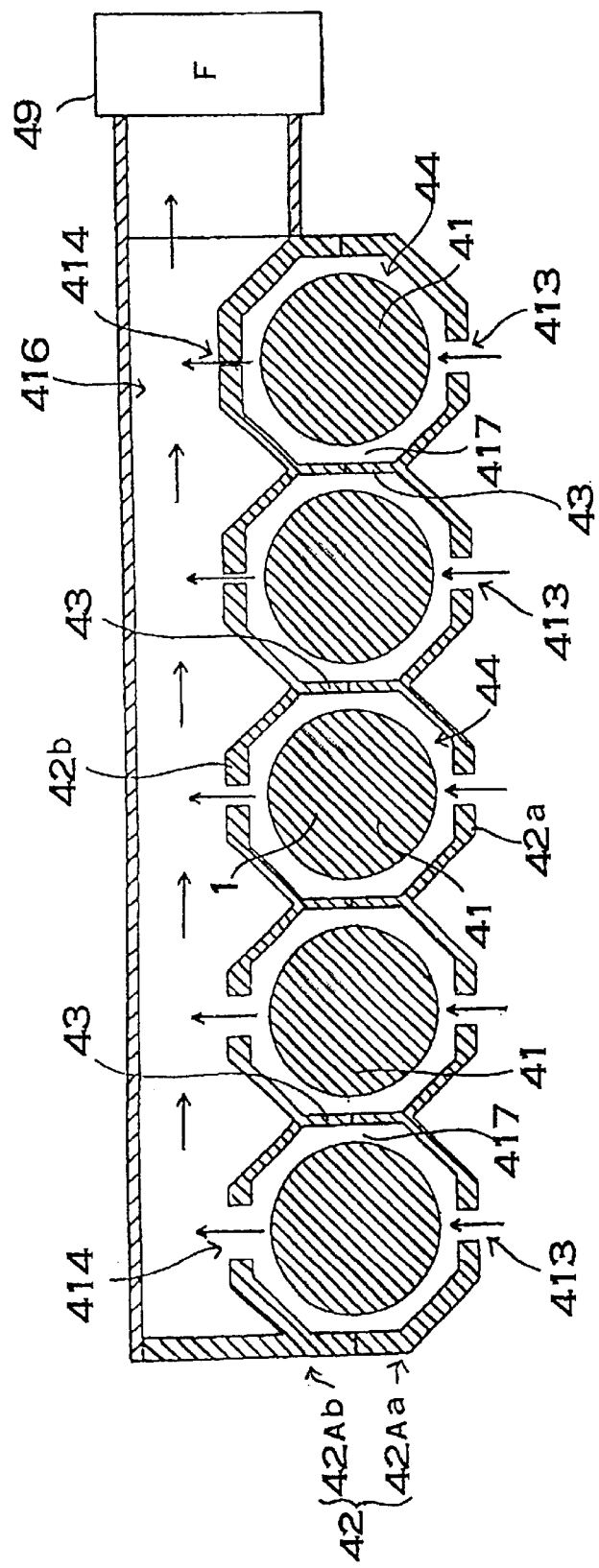
FIG. 4 is a side cross-sectional view of another embodiment of the power supply apparatus of the present invention.

The power supply apparatus shown in FIGS. 3 and 4 is provided with a plurality of power modules 31, 41, a holder-case 32, 42 which houses these power modules 31, 41, and a fan 39, 49 to cool power modules 31, 41 in the holder-case 32, 42. The holder-case 32, 42 holds the power modules 31, 41 arranged in a parallel fashion of a plurality of rows, and cools the power modules 31, 41 with air which passes through the case.

A power module 31, 41 is a plurality of rechargeable batteries or high capacitance super-capacitors joined in a linear fashion. For example, power modules 31, 41 may have six series connected rechargeable batteries joined in a straight line. A power module using super-capacitors has a plurality of super-capacitors connected in parallel or series. However, a power module may also be made up of a single rechargeable battery or super-capacitor. The power module 31 shown in FIG. 5 has circular cylindrical rechargeable batteries 36 joined in a straight line by dish-shaped connectors 37. Electrode terminals 35 comprising a positive electrode terminal 35A and a negative electrode terminal 35B are connected at the ends of a power module 31.

Figure 5:
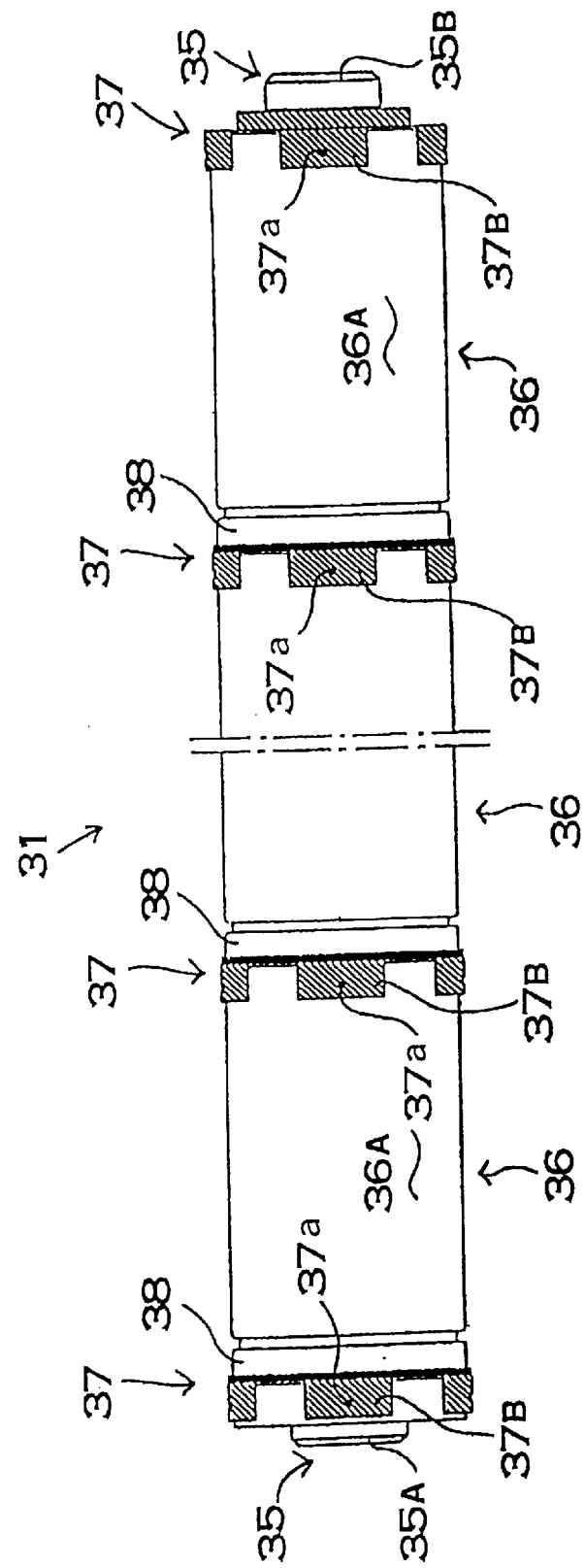
FIG. 5 is a side view of a power module contained in a power supply apparatus.
Figure 6:
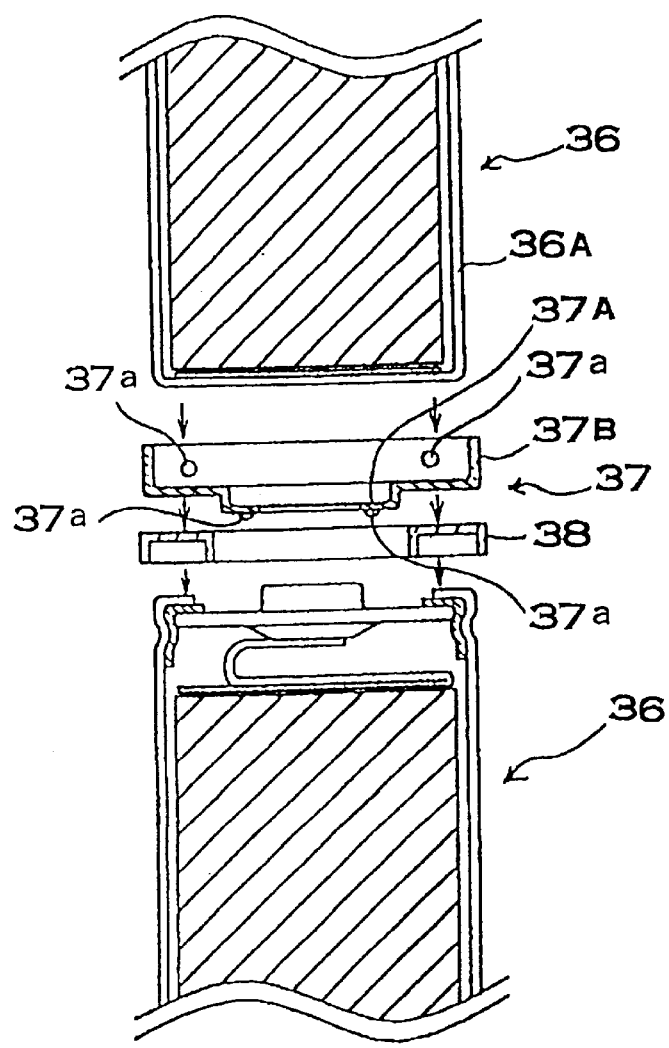
FIG. 6 is an exploded cross-sectional view of the power module shown in FIG. 5.

The structure for connecting rechargeable batteries 36 in a straight line with dish-shaped connectors 37 is shown FIGS. 5 and 6. In a power module 31 of this structure, a disk region 37A of a dish-shaped connector 37 is weld-connected to the positive terminal of a circular cylindrical battery 36. The disk region 37A of the dish-shaped connector 37 is provided with projections 37a for welding to the positive terminal of the circular cylindrical battery 36. When the projections 37a of the dish-shaped connector 37 are welded to the positive terminal, welding electrode rods push on the top surfaces of the projections 37a. To prevent short circuits between the dish-shaped connector 37 and the circular cylindrical battery 36, a ring-shaped insulator 38 is sandwiched between the dish-shaped connector 37 and the circular cylindrical battery 36.

In addition, a circular cylindrical battery 36 is inserted into the dish-shaped connector 37 flange region 37B to connect the negative terminal of the circular cylindrical battery 36, which is its outer case 36A, with the flange region 37B. Similar to the disk region 37A, the flange region 37B also has projections 37a provided on its inner surface for welding to the battery outer case 36A. During a welding operation, welding electrode rods push on the outside of the flange region 37B in the vicinity of projections 37a.

Although not illustrated, series connected batteries can be joined without using dish-shaped connectors by weld-connection to the facing sides of lead-plates bent in U-shapes. In this power module, battery terminals are welded to facing sides of U-shaped lead-plates by passing a high current pulse through the batteries in the direction of battery discharge. Further, metal plates can also be sandwiched between positive and negative battery terminals, and a high current pulse can be passed through the batteries in their direction of discharge to weld the metal plates to the battery terminals.

Still further, positive and negative battery terminals of a power module can also be directly welded together with no intervening metal plate between batteries. Here, conical projections are provided on the upper surface of a battery sealing plate, which is the positive electrode terminal, and these projections are welded to the negative electrode terminal of an adjacent battery by passing of a high current pulse.

Power modules 31, which have a plurality of rechargeable batteries 36 connected in series, have the positive side of the batteries 36 connected to a positive terminal 35A and the negative side connected to a negative terminal 35B.

Rechargeable batteries 36 of the power modules 31 are nickel-hydrogen batteries. However, batteries such as nickel-cadmium batteries or lithium-ion batteries may also be used as the rechargeable batteries 36 of the power modules 31.

Although not illustrated, temperature sensors are fixed to the surface of each rechargeable battery of the power modules. Temperature sensors are devices which can measure battery temperature. Preferably, PTC devices which change electrical resistance with battery temperature are used as temperature sensors. Temperature sensors fixed to the surface of each battery are connected linearly and in series via sensor leads, which extend along, and are fixed lengthwise to the surface of the power modules. Temperature sensors and sensor leads are bonded to battery surfaces, or for configurations with materials such as heat-shrink tubing covering battery surfaces, sensors and leads may also be attached via the heat-shrink tubing. However, in the power supply apparatus of the present invention, since one row of power modules 31 41 is housed in a partition 34, 44, there is no requirement to insulate power modules 31, 41 from adjacent power modules 31, 41. Consequently, it is not necessary to always insulate power modules 31, 41 by covering them with heat-shrink tubing.

As shown in FIGS. 3 and 4, the holder-case 32, 42 is box shaped having a first surface plate 32a, 42a and a second surface plate 32b, 42b as opposing surfaces. A plurality of rows of power modules 31, 41 are arranged side-by-side in a single plane parallel to the first surface plate 32a, 42a and second surface plate 32b, 42b.

The holder-case 32, 42 is provided with upper and lower cover-casings. The cover-casings are made up of a first cover-casing 32Aa, 42Aa formed as a single unit with the first surface plate 32a, 42a, and a second cover-casing 32Ab, 42Ab formed as a single unit with the second surface plate 32b, 42b. The cover-casings are formed overall from plastic, and assembly primarily of these casings results in the holder-case 32, 42.

In addition, As shown in FIGS. 3 and 4, the holder-case 32, 42 is provided with walls 33, 43 between the power modules 31, 41 which are housed side-by-side. The walls 33, 43 are formed by single piece construction with the first cover-casing 32Aa, 42Aa and the second cover-casing 32Ab, 42Ab, and extend from the first surface plate 32a, 42a to the second surface plate 32b, 42b to form a plurality of partitions 34, 44 inside the first surface plate 32a, 42a and the second surface plate 32b, 42b. Walls 33, 43 formed as single units with the first cover-casing 32Aa, 42Aa and the second cover-casing 32Ab, 42Ab are joined without gaps at interfaces to form partitions 34, 44 which do not leak air from one to another.

Figure 7:
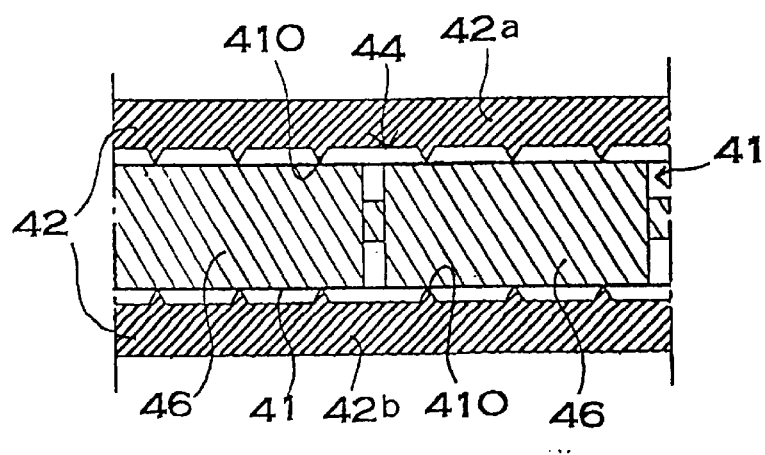
FIG. 7 is a lengthwise cross-sectional view of the power supply apparatus shown in FIG. 4.

Power modules 31, 41 are disposed in each partition 34, 44. In the holder-case 32, 42 of the figures, one row of power modules 31 41 is disposed in each partition 34, 44. As shown in FIG. 7, retaining projections 410 are provided protruding from partition walls to hold power modules 41 in fixed positions within the partitions 44. Retaining projections 410 are formed as single pieces with the plastic first surface plate 42a and second surface plate 42b, and power modules 41 are retained in fixed positions by sandwiching them between the retaining projections 410 of both surface plates. The power modules 41 are held by the retaining projections 410 in a manner that creates gaps through which air can flow between the power modules 41 and the inside surfaces of the partitions 44. The retaining projections 410 shown in FIG. 7 are established as ribs which extend laterally with respect to the power modules 41.

The holdercase 32, 42 divides the flow of cooling air and passes it through each partition 34, 44. To realize this, flow inlets 313, 413 are opened through the first surface plate 32a, 42a to divide the air flow and direct it into each partition 34, 44, and exhaust outlets 314, 414 are opened through the second surface plate 32b, 42b to expel air from each partition 34, 44 to the outside, as shown in FIGS. 3 and 4.

The holder-case 32, 42 of these figures has valley regions between adjacent power modules 31, 41 formed in the shape of grooves, and the lateral cross-sections of the interiors of partitions 34, 44 take on octagon shapes. Compared with partition interiors having square lateral cross-sections, these partition inside walls have shapes which come closer to following power module 31, 41 surface contours. Cooling ducts 317, 417, which deliver air and cool the power modules 31, 41, are established between partition 34, 44 inside walls and power modules 31, 41. Compared with partition 34, 44 interiors having square lateral cross-sections, partition 34, 44 interiors having octagon shaped lateral cross-sections have the characteristic that gaps forming the cooling ducts 317, 417 can be made more uniform in width.

Figure 8:
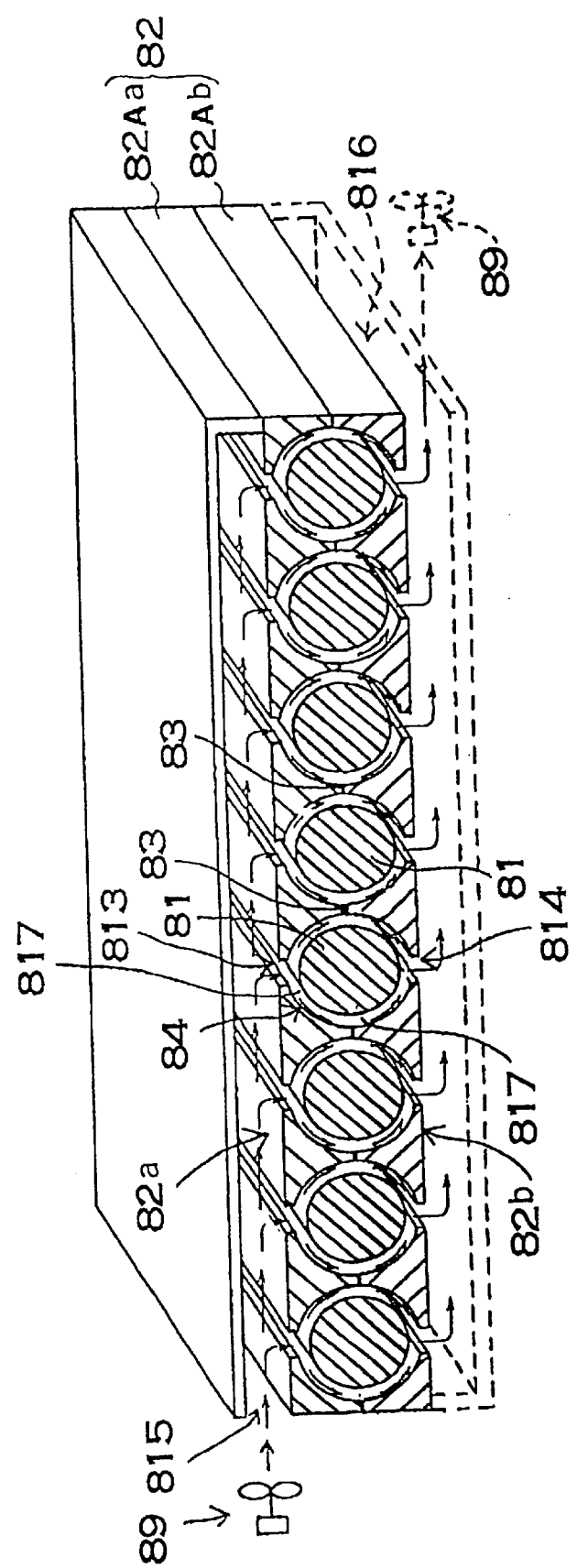
FIG. 8 is a perspective cross-sectional view of another embodiment of the power supply apparatus of the present invention.

Further, as shown in FIG. 8, partitions 84 which contain circular cylindrical power modules 81 can have inside walls with circular lateral cross-sections. Specifically, partitions 84 can be circular columns to allow even more uniform cooling duct 817 width between partition 84 inside walls and power modules 81. Still further, partitions 84 which contain circular cylindrical power modules 81 may also have elliptical lateral cross-sections.

In the holder-case 32, 42 of FIGS. 3 and 4, slit shaped flow inlets 313, 413 and exhaust outlets 314, 414 are opened between walls 33, 43 and located at the center regions of partitions 34, 44. The holder-case 32, 42 has flow inlets 313, 413 opened through the first surface plate 32*a*, 42*a* and exhaust outlets 314, 414 opened through the second surface plate 32*b*, 42*b*. The slit shaped flow inlets 313, 413 and exhaust outlets 314, 414 extend along the lengthwise direction of the power modules 31, 41. This configuration of holder-case 32, 42 has the characteristic that cooling air can be made to flow rapidly over power module 31, 41 surfaces for efficient cooling.

The power supply apparatus of FIG. 3 is provided with an air inlet duct 315 at the surface of the first surface plate 32*a*. The air inlet duct 315 connects with a fan 39, and the fan 39 forcibly supplies cooling air into the inlet duct 315. Inlet duct 315 cooling air flow is divided among each flow inlet 313 and introduced into each partition 34. To pass cooling air equally through all partitions 34 of the power supply apparatus shown in FIG. 3, flow inlets 313 at the upstream end of the air inlet duct 315 are made smaller than flow inlets 313 at the downstream end of the air inlet duct 315. Since cooling air supplied by the fan 39 has high pressure at the upstream end of the air inlet duct 315, large quantities of air can be supplied through small flow inlets 313. Since cooling air pressure decreases at the downstream end of the air inlet duct 315, flow inlet 313 size is increased to increase the amount of air supplied to the downstream partitions 34. Consequently, this configuration of power supply apparatus can supply cooling air uniformly to all partitions 34.

The power supply apparatus of FIG. 4 is provided with an outlet duct 416 at the surface of the second surface plate 42*b*. The outlet duct 416 connects with a fan 49, and the fan 9 forcibly intakes cooling air from the outlet duct 416 and exhausts it. The outlet duct 416 combines air flow expelled from each partition 44 and exhausts it outside the system. To pass cooling air equally through all partitions 44 of the power supply apparatus shown in FIG. 4, exhaust outlets 414 at the upstream end of the outlet duct 416 are made larger than exhaust outlets 414 at the downstream end of the outlet duct 416. Since the fan 49 efficiently intakes cooling air at the downstream end of the outlet duct 416, large quantities of air can be expelled from small exhaust outlets 414. Consequently, this configuration of power supply apparatus can pass cooling air uniformly through all partitions 44.

Figure 9:
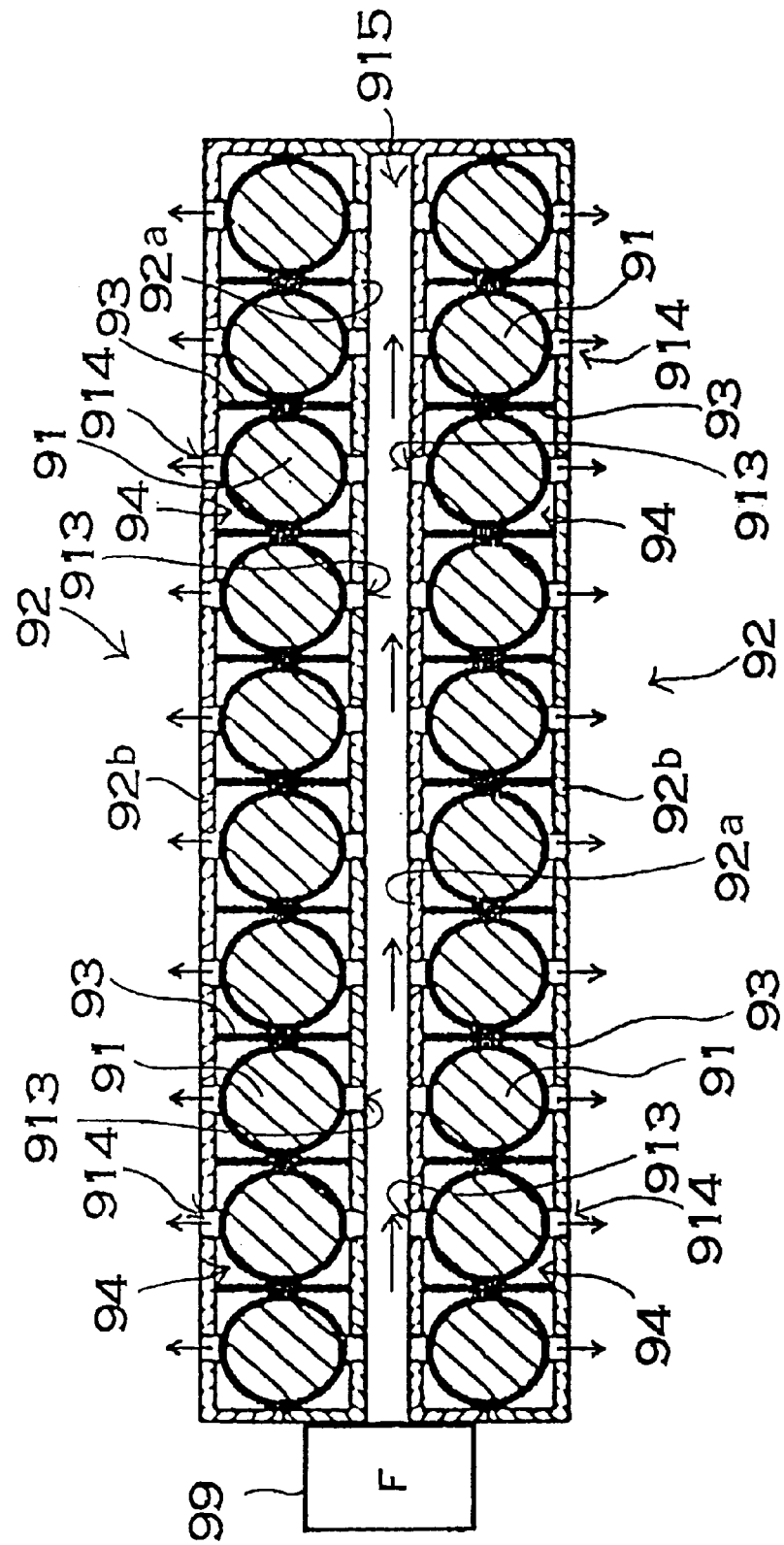
FIG. 9 is a cross-sectional view of another embodiment of the power supply apparatus of the present invention.
Figure 10:
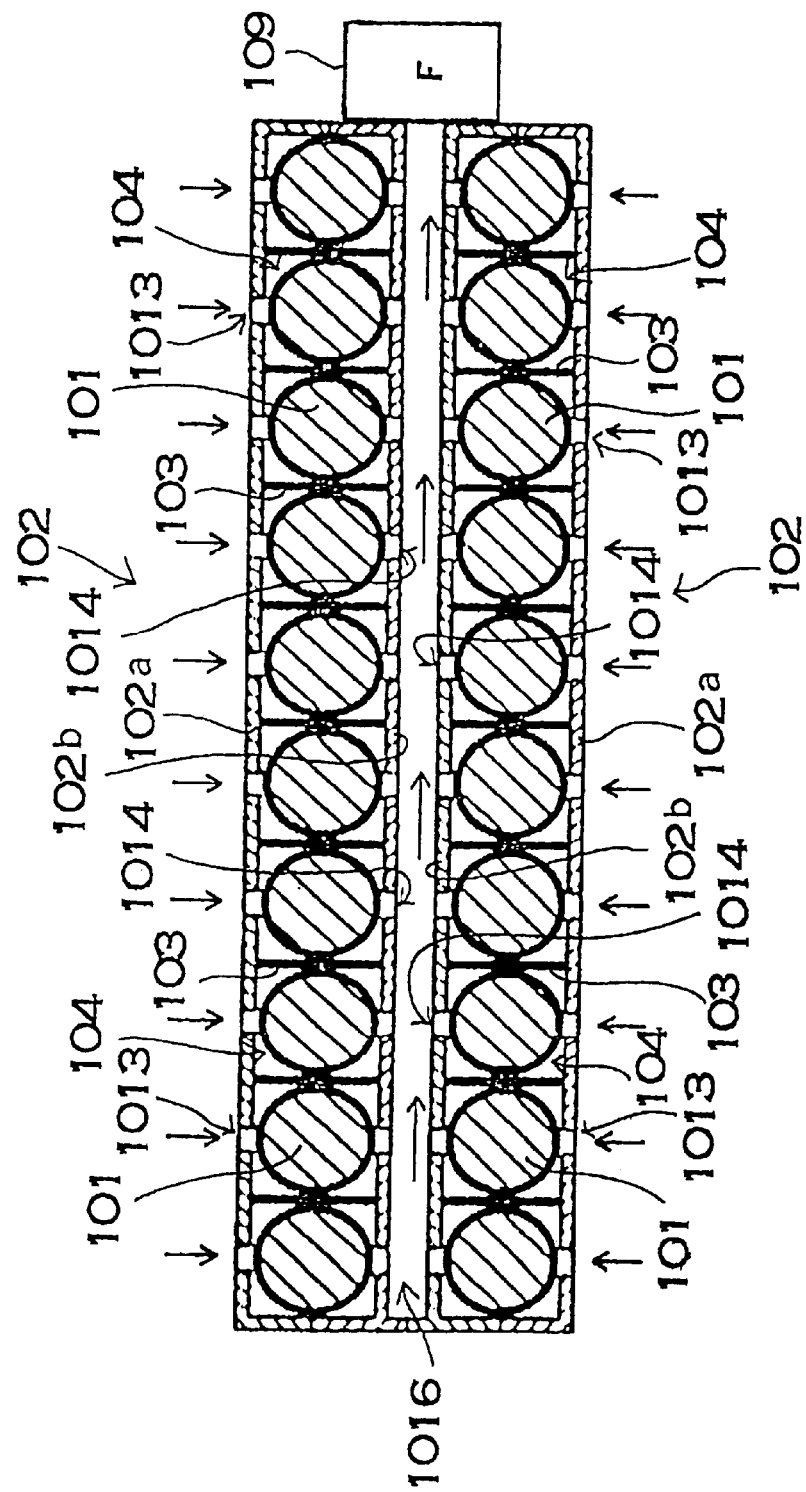
FIG. 10 is a cross-sectional view of another embodiment of the power supply apparatus of the present invention.

Further, the power supply apparatus shown in FIGS. 9 and 10 have two tiered holder-cases 92, 102 with the two tiers disposed in a parallel fashion in mutual opposition around the air inlet duct 915 or outlet duct 1016. The power supply apparatus of FIG. 9 is provided with an air inlet duct 915 at first surface plate 92*a* surfaces similar to FIG. 3 but with a pair of holder-case 92 tiers disposed on opposite sides of the air inlet duct 915. This power supply apparatus supplies cooling air from the fan 99 flowing in the air inlet duct 915 to holder-case 92 tiers disposed on both sides of the air inlet duct 915, and cools power modules 91 disposed in single rows in each holder-case 92 partition 94. In FIG. 9, 92*b* is the second surface plate, 93 are the walls, 913 are the flow inlets, and 914 are the exhaust outlets.

The power supply apparatus of FIG. 10 is provided with an outlet duct 1016 at second surface plate 102*b* surfaces similar to FIG. 4 but with a pair of holder-case 102 tiers disposed on opposite sides of the outlet duct 1016. In this power supply apparatus, the fan 109 connected to the outlet duct 1016 forcibly intakes cooling air from both holder-case 102 tiers, and cools power modules 101 disposed in single rows in each partition 104 of holder-case 102 tiers disposed on both sides of the outlet duct 1016. In FIG. 10, 102*a* is the first surface plate, 103 are the walls, 1013 are the flow inlets, and 1014 are the exhaust outlets.

The power supply apparatus of FIGS. 3 and 4 have partitions 34, 44 with inside wall lateral cross-sections shaped as octagons to allow nearly uniform cooling duct 317, 417 width. This in turn allows nearly uniform flow rate of air through the cooling ducts 317, 417, and prevents dead-air within partitions 34, 44. However, since the power supply apparatus of the present invention disposes power modules as a single row in each partition 94, 104, even if partition 94, 104 inside wall lateral cross-sections are square-shaped as shown in FIGS. 9 and 10, power modules 91 101 can be sufficiently cooled.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims or equivalence of such metes and bounds thereof are therefore intended to be embraced by the claims.

What is claimed is:

1. A power supply apparatus comprising:
   a plurality of power modules;
   a holder-case which houses the power modules in a parallel fashion in a plurality of rows, and permits the power modules to be cooled with air passing through its interior;
   a fan for forcibly supplying air to, or exhausting air from, the holder-case; and wherein:
   the holder-case has a box shape and has a first surface plate and a second surface plate defining opposite surfaces, and the plurality of power modules are arranged laterally, in parallel, and in a single plane along the first surface plate and the second surface plate;
   the holder-case is provided with a plurality of walls located between the rows of power modules, the walls extend from the first surface plate to the second surface plate and divide the interior of the holder-case into a plurality of rows of partitioned cooling ducts, and each row of the power modules is disposed in one of the partitioned cooling ducts;
   a plurality of flow inlets are opened through the first surface plate of the holder-case so as to communicate with the partitioned cooling ducts, respectively,
   the flow inlets divide and induce air flow into the partitioned cooling ducts, and exhaust outlets are opened through the second surface plate to permit air to be expelled to the outside of the holder-case after passing through the partitioned cooling ducts;

the fan is operable to create a cooling air flow that is divided and induced to flow through the first surface plate flow inlets into the partitioned cooling ducts to cool the power modules, the cooling air that has performed its cooling function is expelled from the partitioned cooling ducts via the second surface plate exhaust outlets, and thereby cooling the power modules disposed in the partitioned cooling ducts; and an air inlet duct defined in part by a surface of the first surface plate so as to permit cooling air flow to be delivered from the outside of the holder-case to the first surface flow inlets via the fan.

2. A power supply apparatus as claimed in claim 1, wherein the flow inlets are made smaller at an upstream end of the air inlet duct than at a downstream end of the air inlet duct.

3. A power supply apparatus as claimed in claim 1, further comprising a second holder case disposed in parallel to the first holder case and on an opposite side of the air inlet duct of the first holder case.

4. A power supply apparatus as claimed in claim 1, wherein the flow inlets and the exhaust outlets are defined by slits extending in a lengthwise direction of the power modules.

5. A power supply apparatus as claimed in claim 1, wherein the power modules are shaped as circular cylinders, a lateral cross-section of inside walls of each of the partitioned cooling ducts is polygonal with at least eight sides, and cooling flow passages are formed between outer surfaces of the power modules and the inside walls so that air flowing in the partitioned cooling ducts will flow along the outer surfaces of the power modules.

6. A power supply apparatus as claimed in claim 5, wherein each cooling flow passage has a width that is nearly constant over the entire power module circumference.

7. A power supply apparatus as claimed in claim 1, wherein the power modules are shaped as circular cylinders, and lateral cross-sections of interior wall surfaces of the partitioned cooling ducts are circular to elliptical, and cooling passages are formed between outer surfaces of the power modules and the inside walls so that air flowing through the partitioned cooling ducts will flow along the outer surfaces of the power modules.

8. A power supply apparatus as claimed in claim 7, wherein each of the cooling passages has a width that is nearly constant over the entire power module circumference.

9. A power supply apparatus as claimed in claim 1, wherein the first surface plate and the second surface plate are provided with integrally formed retaining projections to hold the power modules inside of the partitioned cooling ducts.

10. A power supply apparatus as claimed in claim 1, wherein the power modules have a circular column shape and the power modules are disposed along a central axis of the corresponding partitioned cooling duct.

11. A power supply apparatus as claimed in claim 1, wherein each of the power modules comprises a plurality of rechargeable batteries connected in a linear fashion.

12. A power supply apparatus as claimed in claim 1, wherein each of the power modules comprises a plurality of high static charge capacity super capacitors connected in a linear fashion.

13. A power supply apparatus as claimed in claim 1, wherein the partitioned cooling ducts are adapted to take cooling air from outside of the holder-case through the first surface flow inlets via the air inlet duct.

14. A power supply apparatus comprising:
a plurality of power modules;
a holder-case which houses the power modules in a parallel fashion in a plurality of rows, and permits the power modules to be cooled with air passing through its interior;
a fan for forcibly supplying air to, or exhausting air from, the holder-case; and wherein:
the holder-case has a box shape and has a first surface plate and a second surface plate defining opposite surfaces, and the plurality of power modules are arranged laterally, in parallel, and in a single plane along the first surface plate and the second surface plate;
the holder-case is provided with a plurality of walls located between the rows of power modules, the walls extend from the first surface plate to the second surface plate and divide the interior of the holder-case into a plurality of rows of partitioned cooling ducts, and each row of the power modules is disposed in one of the partitioned cooling ducts;
a plurality of flow inlets are opened through the first surface plate of the holder-case so as to communicate with the partitioned cooling ducts, respectively,
the flow inlets divide and induce air flow into the partitioned cooling ducts, and exhaust outlets are opened through the second surface plate to permit air to be expelled to the outside of the holder-case after passing through the partitioned cooling ducts;
the fan is operable to create a cooling air flow that is divided and induced to flow through the first surface plate flow inlets into the partitioned cooling ducts to cool the power modules, the cooling air that has performed its cooling function is expelled from the partitioned cooling ducts via the second surface plate exhaust outlets, and thereby cooling the power modules disposed in the partitioned cooling ducts; and
an air outlet duct defined in part by a surface of the second surface plate so as to permit air, which has been warmed by the power modules in the partitioned cooling duct, to be delivered from the second surface plate exhaust outlets to outside of the holder case via the fan.

15. A power supply apparatus as claimed in claim 14, wherein the exhaust outlets are made larger at an upstream end of the air outlet duct than at a downstream end of the air outlet duct.

16. A power supply apparatus as claimed in claim 14, further comprising a second holder case disposed in parallel to the first holder case and on an opposite side of the air outlet duct.

17. A power supply apparatus as claimed in claim 14, wherein the partitioned cooling ducts are adapted to take cooling air from outside of the holder-case through the first surface flow inlets.

18. A power supply casing comprising:
a holder-case for housing a plurality of power modules in a parallel arrangement and in a single plane,
said holder-case including a first plate, a second plate positioned in parallel to the first plate, and a plurality of parallel walls extending between said first plate and said second plate,
wherein said first plate, said second plate, and said parallel walls define a plurality of partitioned cooling ducts for holding the plurality of power modules, respectively, wherein said first plate is formed with a plurality of air inlet openings communicating with said partitioned cooling ducts, respectively, and said second plate is formed with a plurality of air outlet openings communicating with said partitioned cooling ducts, respectively;

a fan for forcibly supplying cooling air to, or exhausting cooling air from, the partitioned cooling ducts, wherein the flow of cooling air is divided by the flow inlets so as to flow through the partitioned cooling ducts and out of the outlet openings so as to cool the power modules held in each of the partitioned cooling ducts; and an air inlet duct defined in part by a surface of said first plate so as to permit cooling air flow to be delivered from the outside of the holder-case to the first surface plate air inlet openings via the fan, wherein the flow inlets are made smaller at an upstream end of said air inlet duct than at a downstream end of said air inlet duct.

19. A power supply apparatus as claimed in claim 18, further comprising a second holder case disposed in parallel to said first holder case and on an opposite side of said air inlet duct relative to said first holder case.

20. A power supply apparatus comprising:

a holder-case for housing a plurality of power modules a parallel arrangement in a single plane, said holder-case including a first plate, a second plate positioned in parallel to the first plate, and a plurality of parallel walls extending between said first plate and said second plate, wherein said first plate, said second plate, and said parallel walls define a plurality of partitioned cooling ducts for holding the plurality of power modules, respectively, wherein said first plate is formed with a plurality of air inlet openings communicating with said partitioned cooling ducts, respectively, and said second plate is formed with a plurality of air outlet openings communicating with said partitioned cooling ducts, respectively;

a fan for forcibly supplying cooling air to, or exhausting cooling air from, the partitioned cooling ducts, wherein the flow of cooling air is divided by the flow inlets so as to flow through the partitioned cooling ducts and out of the outlet openings so as to cool the power modules held in each of the partitioned cooling ducts; and an air outlet duct defined in part by a surface of said second plate so as to deliver air that has been warmed by the power modules from the second surface plate air outlet openings to outside of the holder-case via the fan, wherein the air outlet openings are made larger at an upstream end of said air outlet duct than at a downstream end of said air outlet duct.

* * * * *